(12) United States Patent
Lilenfeld

(10) Patent No.: US 6,680,728 B1
(45) Date of Patent: *Jan. 20, 2004

(54) CURSOR CONTROL DEVICE FOR CONVENIENT AND ERGONOMIC HAND-HELD OR WORK-SURFACE USE

(76) Inventor: David Michael Lilenfeld, 2158 Cumberland Pkwy., Apt. 4305, Atlanta, GA (US) 30339

( * ) Notice: Subject to any disclaimer, the term of this patent is extended or adjusted under 35 U.S.C. 154(b) by 0 days.

This patent is subject to a terminal disclaimer.

(21) Appl. No.: 09/489,796

(22) Filed: Jan. 24, 2000

Related U.S. Application Data

(63) Continuation-in-part of application No. 09/379,646, filed on Aug. 23, 1999.

(51) Int. Cl.[7] .................................................. G09G 5/00
(52) U.S. Cl. ........................................ 345/156; 345/157
(58) Field of Search ................................. 345/156, 157, 345/158, 159, 160, 163, 164, 167, 173

(56) References Cited

U.S. PATENT DOCUMENTS

| 5,122,654 | A | * | 6/1992 | Koh et al. | 250/221 |
| 5,428,368 | A | * | 6/1995 | Grant | 345/163 |
| 5,578,817 | A | * | 11/1996 | Bidiville et al. | 345/157 |
| 5,666,138 | A | | 9/1997 | Culver | 345/161 |
| 5,668,574 | A | * | 9/1997 | Huang | 345/158 |
| 5,760,766 | A | | 6/1998 | Auber et al. | 345/167 |
| 5,767,841 | A | | 6/1998 | Hartman | 345/167 |
| 5,956,018 | A | * | 9/1999 | Pejic et al. | 345/157 |
| 6,031,518 | A | * | 2/2000 | Adams | 345/156 |
| 6,184,869 | B1 | * | 2/2001 | Harding | 345/163 |
| 6,545,667 | B1 | * | 4/2003 | Lilenfield | 345/169 |

* cited by examiner

Primary Examiner—Vijay Shankar

(57) ABSTRACT

The present invention is a cursor control device to be used in conjunction with a computer which allows for convenient, easy and ergonomic hand-held or work surface use. Actuation of the buttons on the device require only the natural flexing or squeezing motion of the fingers and thumb. The device can be used in either mode without mechanical or electrical change.

11 Claims, 2 Drawing Sheets

CURSOR CONTROL DEVICE FOR CONVENIENT AND ERGONOMIC HAND-HELD OR WORK-SURFACE USE

CROSS-REFERENCE TO RELATED APPLICATIONS

The instant application is a continuation-in-part of application Ser. No. 09/379,646; filed by David M. Lilenfeld on Aug. 23, 1999.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

Generally speaking, there are two kinds of data input tools used with computers, a keyboard and a cursor control device. The present invention is a cursor control device which can be conveniently and ergonomically operated while being held in the user's hand or while resting on a work surface.

There are various types of cursor control devices used today; most popular are the mouse, the trackball, the touchpad, and, of more recent development, the isometric post and the navigation dome. A mouse is a substantially immobile device which includes a ball that depends from its underside and rests upon a flat work surface. The ball is rotated while in contact with the work surface by movement of the mouse by the user across the work surface. A trackball, which is somewhat analogous to an upside down mouse, houses a ball which protrudes through the top of the trackball body and is manipulated by the user's fingers, hand or thumb. With both the mouse and trackball, rotation of the ball causes the transmission of data to the computer which causes a corresponding movement of the cursor on the computer screen. Touchpads are substantially immobile bases having a touch-sensitive membranous sensor pad located on a top-surface thereof. When a user touches a portion of the pad, the portion either mechanically depresses or registers a change in temperature effected by heat from the user's finger, to sense the location on the pad with which the user made contact. Circuitry within the touchpad translates the sensed location into a command to the computer to control the location of the cursor on the computer screen. Some touchpads are pressure sensitive. That is, they are capable of providing a signal representative of the force that the user is bringing to bear on a portion of the touchpad.

A fourth type of popular cursor control device is the isometric post: a small force-sensing stick. An isometric post is also commonly referred to as an erasure-head pointing device, such as IBM's TRACKPOINT, and is typically situated among the keys of the keyboard. The isometric post is operated by the user applying directional pressure with a single finger on the top of the post. The force applied to the post by the user causes the transmission of data to the computer to control the cursor on the computer screen. An additional means of controlling a cursor is a "navigation dome" located on the top of the device which uses a sensing mechanism incorporating non-contacting magnetic technology.

In addition to a means for controlling the cursor, cursor control devices also consist of buttons or keys to transmit additional data to the computer. Depending upon the location the user has placed the cursor, the keys can be used to achieve such tasks as activation of menus, selection of menu choices, movement of screens and windows, blocking and moving text and data, drawing and reshaping lines and objects and the "pointing" and "clicking" technique used to work with programs based in graphical user interfaces.

In addition to a means for controlling the cursor and buttons, some cursor control devices contain scroll wheels. Scroll wheels permit the up and down scrolling of windows on the computer screen without requiring the "pointing and clicking" technique otherwise required in a graphical environment. Scroll wheels are typically located on the top of the device, near the buttons so that the same finger or fingers used to activate the buttons can manipulate the scroll wheel. The scroll wheel consists of a spring-loaded supplementary control in the body of the device for generating additional transmissions to the computer which specifically control the window scrolling rate and direction. Again, because the electrical and computer interface functions of the device of the present invention are not claimed, they are described only briefly herein, merely for the purpose of making a full disclosure.

Originally, because computer programs were primarily operated by the user entering text, the most used computer data input tool was the keyboard. The cursor control device was mainly used to control the location the text was entered. While today the keyboard remains an integral instrument in operating computers, the growing popularity of certain operating systems (such as MICROSOFT WINDOWS and MAC OS) and certain types of applications (such as design tools, computer games, voice-driven software and GUIs, such as the Internet) has placed an increasingly heavy demand for the functions performed by cursor control devices. While the primary function of the keyboard is to enter text into the computer, almost all computer programs now provide a graphical environment which necessitates almost constant movement of the cursor. Consequently, the importance of the cursor controller and the amount of time the user spends using it has greatly increased to become at least equivalent to that of the keyboard. In fact, research directed by Peter W. Johnson of University of California Berkeley/San Francisco Ergonomics Lab, indicates that for the average user the cursor control device consumes one-third to two-thirds of the working time on a computer.

However, as originally conceived, cursor control devices were not designed for the protracted and extensive use which is now required of them. Instead, these devices were intended to have a secondary role complimentary to the primary data input tool, the keyboard. Because of their mere secondary role, cursor control devices were meant to rest substantially immobile on the work surface, to the side of the keyboard. This position allowed the user's hand to be quickly and conveniently moved from the keyboard to the cursor controller and then back to the keyboard which occupied most of the user's time. The efficacy of this design of the cursor control device as merely secondary to the keyboard has been made obsolete by the new and extensive importance of using the cursor control device.

The increased importance cursor control devices play in the operation of computers has revealed several design deficiencies of those devices, mainly being inferior ergonomics. The genesis of these problems is the fact that to be operated, the cursor control devices must be kept on a flat work surface, typically the desk top. Consequently, the cursor control device effectively acts as an "anchor" which forces the user to stay in a position from which he or she can reach and operate the device. The result is that the position of the user's entire body is dictated by the location of the cursor control device on the work surface. To reach and operate the device, then, the user must lean forward from his or her seated position and must bend his or her arm at the elbow, forwardly extend his or her forearm, wrist, and hand and keep this unsupported position the entire time the device is being used. Maintaining this position is uncomfortable and tires the user's back and muscles of the shoulder, elbow, forearm, wrist and hand.

Prior art cursor control devices suffer other deficiencies, such as forcing the user's hand into an unnatural position with his or her palm facing downward. This position is significantly inferior to the ergonomically preferred neutral (or sideways) position. Furthermore, actuating the buttons on these devices causes the hand fatigue since the buttons typically require the unnatural movement of the user's fingers in a downward, instead of inward, direction. This is particularly troublesome when a button on the cursor controller must be held down for an extended period of time, such as to "drag" an item across the computer screen.

As the cursor control device occupies even greater amounts of the computer user's time these ergonomic deficiencies become more pronounced and problematic. The prolonged and repetitive use of cursor control devices cause the user discomfort, fatigue, and pain. After a protracted period of use, such as many hours, it is not unusual for the muscles of the arm, hand, and wrist to become fatigued, making it uncomfortable and even painful to continue to use these devices. Significantly, various repetitive stress injuries, such as the widespread carpal tunnel syndrome, are now associated with extensive use of these stationary devices. Finally, since the user has to lean forward to reach the device on the desk top (instead of occupying a more comfortable reclined or laying position), strain is also put on the user's upper and lower back causing him or her discomfort and pain.

Further disadvantages of these cursor control devices are that they necessitate an available work surface upon which to rest. In many instances, there may be no surface space available or it may be too limited for convenient use. Additionally, as computers become more portable and suitable for use in different places, varying types of places, such as airplanes, it is even more likely that no work surface would be available to the user.

The problem of the necessity of an available work surface is particularly serious with mice which must be moved along the work surface to coordinate movement of the cursor on the computer screen. As larger computer screens become more common, additional space on the work surface is needed to maintain the ability to move the cursor along the entire length of the screen. The cursor control device's necessity for a work surface upon which to lay is also problematic because the height of the available work surface may be uncomfortable for the individual user.

All these problems could be alleviated if cursor control devices were suitable for hand-held use. As discussed above, before the introduction and popularity of GUIs, the user spent most of his or her computer time using the keyboard and thus there was no need for the cursor control device to be suitable for hand-held use. However, as the importance of the cursor control device in operating computers has increased, the users' hands spend less time on the keyboard and more time on the cursor control device. Therefore, cursor control devices should be able to be used while being hand-held.

While mice known in the art may be suitable for use on a flat work surface, an effort to use a mouse in a hand-held manner fails for several reasons. First, to reach the ball, which protrudes from the underside of the mouse body, the user must uncomfortably stretch his or her thumb or fingers around the body to the underside of the mouse. In addition to causing discomfort, this is not the optimum hand position from which to manipulate the ball. Also, if the mouse is being hand-held, the ball cannot be manipulated because once pressure is applied to it the ball recedes into the body of the device beyond the user's reach. The mouse is also not suitable for hand-held use because when it is turned to an inverted angle, the ball recedes into the body of the device, beyond the user's reach. Furthermore, if the mouse is being hand-held, the buttons are not aligned so as to orient the fingers for simultaneous actuation of the buttons and the ball. Additionally, the shape of the mouse is not designed to fill the user's hand while it is being hand-held and thus, to keep the mouse from slipping out of the hand, the user would have to maintain a clenched or contracted hand position the entire time the mouse is being held. This would cause fatigue, pain and discomfort after a protracted period of use. In short, mice known in the art are not designed such that they can be hand-held and operated at the same time. Thus, mice, as known in the art, are not suited for hand-held use.

Trackballs known in the art are also not suitable for hand-held use. Firstly, the bodies of trackballs are too large to be held in the average user's hand. Secondly, the balls found in trackballs are also too large to allow the device to be held in the average user's hand and, even if the trackball can be held, the ball is too large to be manipulated with one hand. Furthermore, neither the ball nor the buttons are aligned such that they can be actuated while the user holds the device. Additionally, keys of the trackball cannot be activated because the fingers are occupied with holding the device and the keys on trackballs are not position so as to permit operating by fingers which are also being used to hand-hold the trackball. For example, LOGITECH, INC. (6505 KAISER DRIVE, FREMONT, Calif. 94555 U.S.A.) sells the TRACKMAN MARBLE+ which is designed to lay on the work surface with its top surface accommodating the user's entire hand. The length and width of the top of the TRACKMAN MARBLE+is the size of the average person's outstretched hand and therefore it is too long and too wide to be hand-held. Furthermore, even if the device could be held in the hand, the ball is so large that it could not be manipulated while still holding the device nor would the fingers, which would be occupied with holding the device, be free to actuate the balls or keys. In short, it is not possible to operate a trackball while it is being hand-held.

In addition to individual mouse and trackball devices, combined mouse-trackball and touchpads are other cursor control devices known in the art. However all the deficiencies of mice and trackballs which have been discussed above also apply to these devices. Combined mouse-trackballs and touchpads are also only suitable for use while laying on flat work surfaces, in close proximity to the keyboard. Thus, users of these devices must also maintain a rigid, unsupported back, arm, wrist and hand position the entire time the device is being used. Furthermore, these devices require some available work surface and also fail to allow the user to achieve a neutral hand position.

Touchpads are also not suitable for hand-held use because they are incorporated into the keyboard itself or because, if standing alone, they are too large to be held. Furthermore, both the pad and the buttons are on the top-surface of the touchpad so that they cannot be actuated while the device is being hand-held. Isometric posts are likewise not suitable for hand-held use. Isometric posts are situated in the keyboard of many lap-top or portable computers, typically between the GHV and B keys on a QWERTY keyboard, and are permanently situated there. Thus, they are obviously not suitable for hand-held use. As can be seen, cursor control devices known in the art are designed for use on a flat work surface but are not suitable for hand-held use.

Some input devices known in the art are intended for hand-held use, however, they are not also suitable for work surface use. U.S. Pat. No. 5,668,574 to Jarlance-Huang, for example, discloses such a device. An attempt to use U.S. Pat. No. 5,668,574 to Jarlance-Huang while it is laying on a flat work surface would fail because the user's fingers which must wrap around and under the device to actuate the buttons and therefore would prevent the device from laying flat on the work surface. Also, this device is not convenient for work surface use because the operating buttons are underneath the device. Thus, if the user is working primarily with the keyboard, he or she would be required to move his or hand from the keyboard, to a position underneath the cursor control device, essentially having to pick the cursor control device off the surface, manipulate the device to control the cursor, then place the device back on the work surface and move his or her hand back to the keyboard. This substantially slows the work process by requiring unnecessary arm, body, and hand movement. Furthermore, if this device is used while it is laying on the work surface, the user's wrist would be in an unnatural, downward and protracted position instead of the preffered neutral position. Therefore, while this device may be suitable for hand-held use it is not suitable for the secondary or complimentary role the cursor control device must take when the keyboard is being used as the primary data input tool; in other words it is not suitable for use while laying on a flat work surface.

U.S. Pat. No. 5,666,138 to Culver also discloses a hand-held device which apparently can be used to control a computer cursor, but, like U.S. Pat. No. 5,668,574 to Huang, it is not suitable for work surface use because the user's fingers must wrap around and under the device to operate it. This would interfere with the device laying flat on the work surface. Thus, this device is likewise not suitable for the secondary or complimentary role the cursor control device must take when the keyboard is being used as the primary data input tool. Similarly, U.S. Pat. No. 5,767,841 to Hartman requires hand-held operation and does not allow on-the-surface use of the trackball. With U.S. Pat. No. 5,767,841 to Hartman, if the trackball is laid on the surface the enter and drag keys on the first side would be unintentionally activated while the user is operating the enter and drag keys on the second side.

U.S. Pat. No. 5,760,766 to Auber and Mosley and an unrelated device sold under the trademark PALM MOUSE (sold by FUJITSU TAKAMISAWA AMERICA, INC.'S, 250 E. Caribbean Drive, Sunnyvale, Calif., 94089), disclose other cursor control devices apparently designed for hand-held use. However, these devices are also unsuitable for comfortable and ergonomic use on the work surface because they are too small and the ball and buttons are too close together. These devices are substantially smaller than the user's hand. To operate either device while it is laying on a flat work surface would require the user to keep his or her hand in an unnaturally clenched or contracted position. Also, if used while laying on the work surface, this device offers no place to rest the thumb or hand, thus the user must hold his or her hand out of the way without support. Also, even as hand-held device, they suffer ergonomic deficiencies. To hold the device requires the user to clench or contract his hand beyond a position which is natural. If this is done for an extended period of time, as is now needed for cursor control devices, the user will experience discomfort, pain and fatigue.

There are other cursor control devices known in the art which, while apparently sufficient for hand-held use, are not suitable for use while the device is laying on a flat work surface. Typically an attempt to use these devices while they are laying on a flat work surface would fail because the keys and the ball can not be independently operated. Because the fingers and palm of a user's hand cannot move independently over each other, it would not be possible for the user to move the ball while continually depressing the key with his/her finger. If the user wants to "drag" an item, for example, his/her fingers would have to press the key and his/her palm would have to move the ball. Therefore, none of the hand-held input devices known in the art allow convenient or comfortable work surface use. Furthermore, these devices are not even ideal for hand-held use.

Thus, it can be seen that cursor control devices currently known in the art are of two types. One type being suitable for use while laying stationary on a flat work surface next to the keyboard. These devices, though, are not suitable for hand-held use. The second type consists of those devices designed for hand-held use. But, as discussed above, these are not suitable for use while laying on a flat work surface. As also discussed above, extensive use of a cursor control device while it is resting on a work surface has significant ergonomic disadvantages and is known to cause repetitive stress injuries, such as carpal tunnel syndrome. Thus, when a user is primarily working with the cursor control device (and not the keyboard), for example, while on the Internet, or any other GUI, the most convenient and comfortable position for the device is in the user's hand. This allows the user to hold his or her arm and hand in whatever position he or she chooses; straight, neutral, or resting on the user's lap, for example. Also, because the user does not need a work surface to support the device, the user may assume a reclined or even a laying position while easily operating the device. If the device can be hand-held, it does not "anchor" the user to the work surface. However, it is understood that during the use of certain other computer applications which primarily require data be entered through the keyboard, such as a word processing program, the cursor control is best used as secondary device, laying on the work surface, next to the keyboard. Therefore, a cursor control device for today's computer should be suited for two types of uses: one being intermittent use on the work surface (as complimentary to the keyboard); the second being hand-held use (when the cursor control device is being used as the primary input tool). As cursor control devices continue to be used in record numbers and for prolonged periods of time there is a need for a device which is suitable for use in a primary role (while being hand-held) and secondary to the keyboard (laying on a flat work surface). Instead of the user's body position being dictated by the location of the cursor control device, the user should be able to choose his or her own body position and the cursor control device should be suitable for use in whichever body position the user chooses to assume.

BRIEF SUMMARY OF THE INVENTION

The present invention relates generally to a computer data input tool and specifically to a device to control a computer cursor which can be conveniently and comfortably operated while resting on a flat work surface or while being held in the user's hand. The computers with which the device of the present invention may be used are lap top, notebook, or personal, and any other for which cursor control is necessary. Because the device can be used while hand-held, it can be operated when there is no work surface available.

The present invention overcomes or substantially reduces the noted deficiencies of the prior art by providing a cursor control device which can be easily and ergonomically operated while being held in the user's hand or while resting on a flat work surface thereby reducing fatigue in the user's upper extremity and reducing repetitive stress injuries associated with mouse and trackball use and reducing lower back strain caused by leaning forward to reach the device on the desk top. Thus, it is a primary object of the present invention to provide a cursor control device use of which minimizes back, arm, hand and wrist fatigue and discomfort even during prolonged periods of continuous use by allowing the user to achieve a completely neutral, freely moving position of the user's arm, while at the appropriate times (as determined by the user) the device can be used while resting on the work surface. With the current invention, the device may be used while the user is sitting or standing, during which time the user may place his or her hand with the device on his or her lap or by his or her side or while the user rests his or her hand on the work surface. In any of these positions, the user can maintain his or her hand in the preferred neutral position. The present invention also allows for actuation of the keys by the slight inward flexing of the user's fingertips as opposed to an unnatural downward motion as required by the devices of the art. The device can be used in these two modes without any mechanical changes or transformations.

It is an additional object of the present invention to provide a cursor control device use of which allows the user to assume a reclining or laying position. Being able to maintain a reclined or laying position while operating the device of the present invention eliminates the need for the user to constantly lean forward to reach the cursor control device on the desk top, thereby reducing or eliminating pain and discomfort to the user's back.

The device of the present invention can be used during either hand-held or work surface use without any mechanical changes or transformations. It is to be understood that both the foregoing general description and the following detailed description are exemplary and are intended to provide further explanation of the invention claimed. These and other advantages of the invention, as well as the preferred embodiment, will be best understood by reference to the attached drawings.

DETAILED DESCRIPTION OF THE INVENTION

Figure 1:
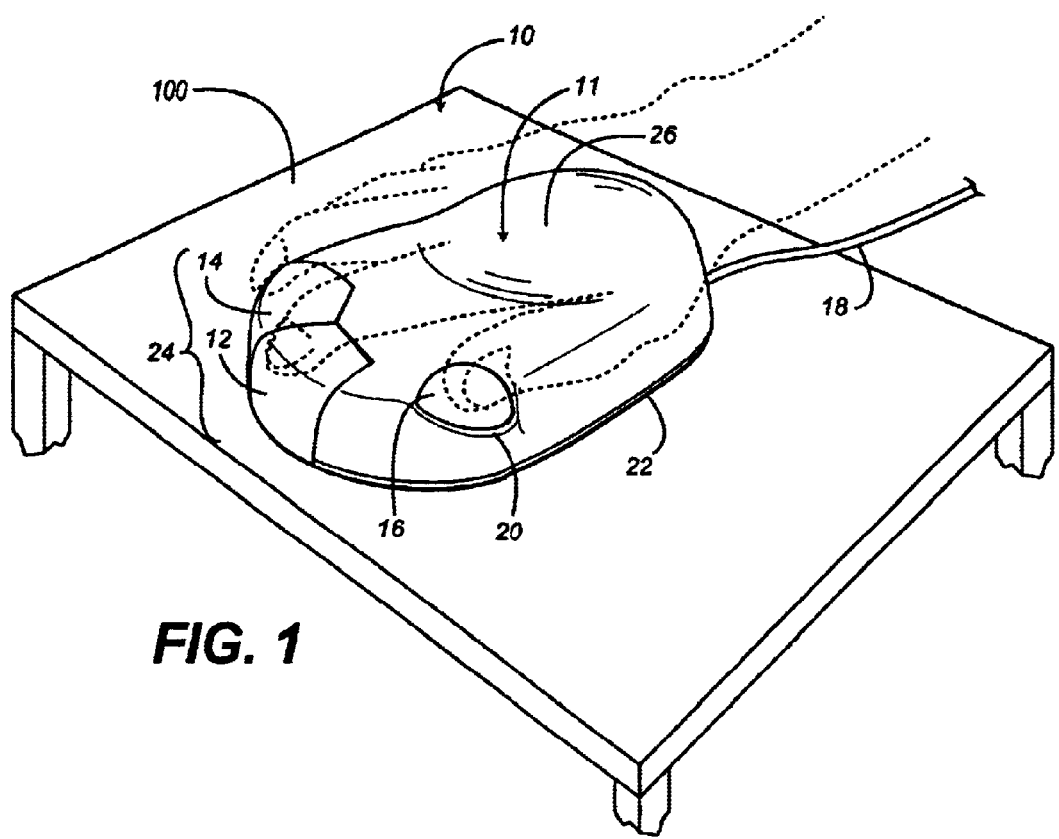
FIG. 1 is a view of the top of the device which shows the device being used on a flat work surface, by the right hand.
Figure 2:
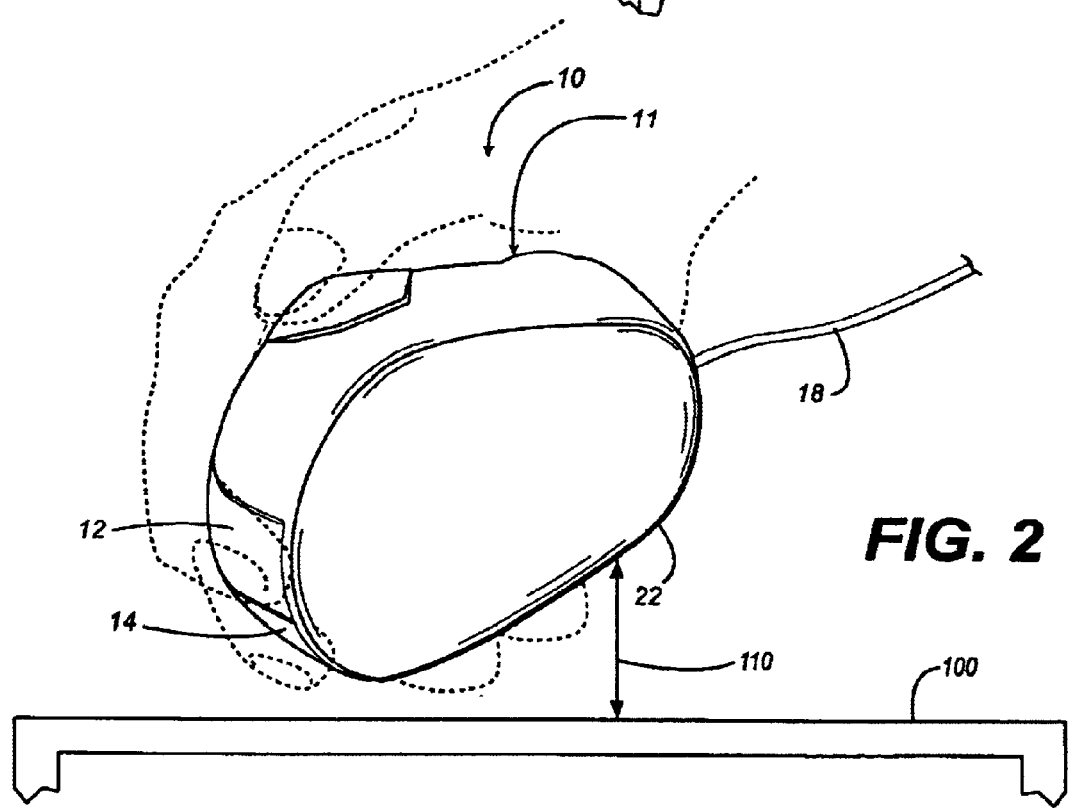
FIG. 2 is a view from the underside of the device which shows the device during hand-held use, by the right hand.
Figure 3:
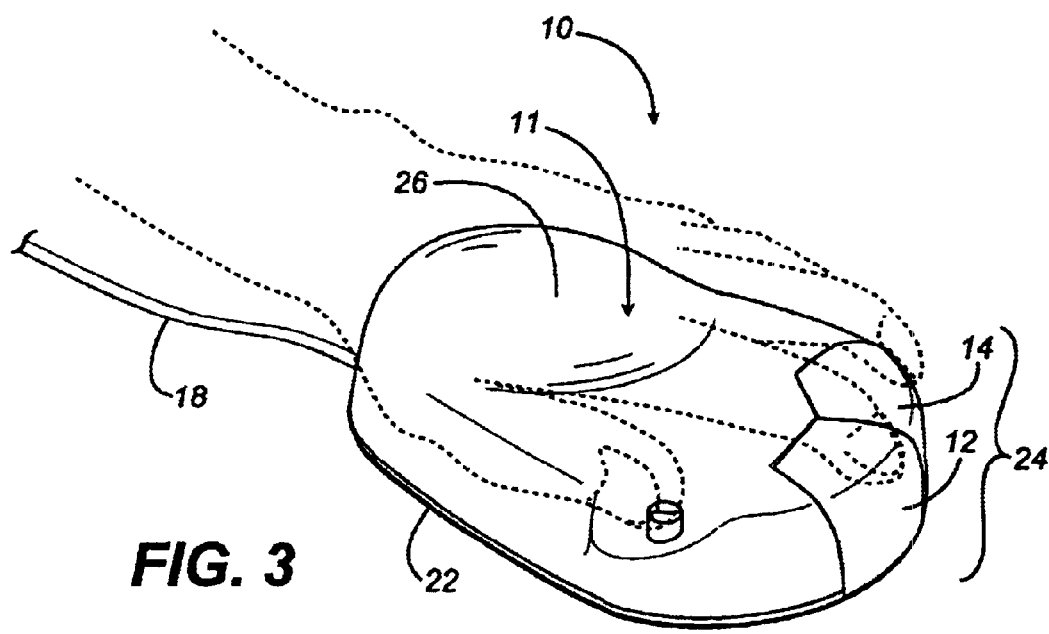
FIG. 3 is a view of the top of the device which shows the device being used on a flat work surface, by the left hand.
Figure 4:
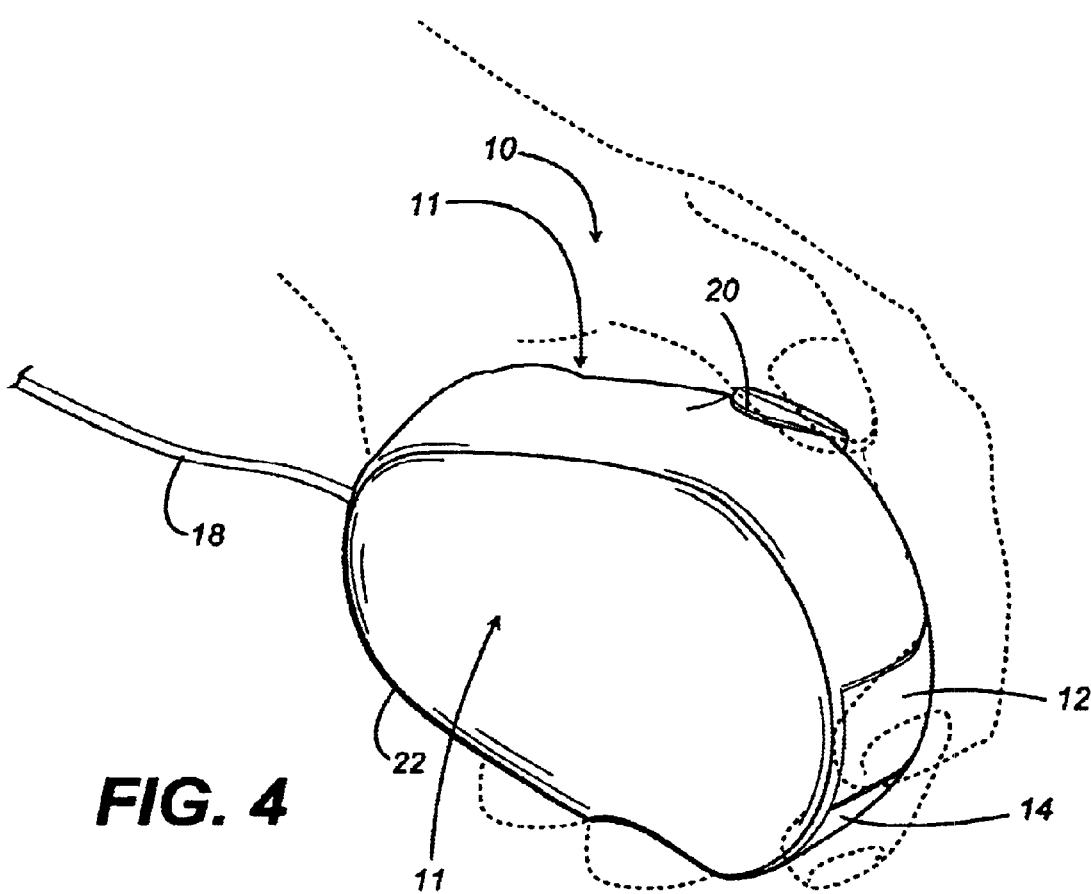
FIG. 4 is a view from the underside of the device which shows the device during hand-held use, by the left hand.

The present invention is a cursor control device 10 for convenient and ergonomic work surface or hand-held use. It will be understood that the present invention relates only to the shape, contouring, and physical configuration of the device 10 and not its electrical or computer interface functions, both of which are well-known in the art. Neither the electrical or computer functions are claimed as my invention but are only discussed below for the purpose of making a full disclosure. Furthermore, for purposes of brevity, the device 10 of the present invention described in this section is for use by the right hand, as shown in FIGS. 1 and 2. However, it is to be understood that this description shall also apply, in all respects equally, to the mirror image of the device 10 of the present invention for use by the left hand, as shown in FIGS. 3 and 4.

The device 10 of the present invention is generally comprised of a body 11 and a cable 18. The body 11 of the device 10 is preferably made of an injection molded plastic, as is known in the art. The body 11 is shaped so as to comfortably fit in the average user's hand, such that, referring to FIG. 1, at the lower portion of the top of the body 11 there is a swell 26 to fill the user's hand which will naturally be slightly cupped during the device's 10 use. The body 11 is further shaped such that the distance from the bottom edge 22 to the ball 16 is equal to the approximate length of the average person's thumb. The width of the body 11 is slightly less than the width of the average person's hand such that the device 10 can be held in the user's hand. The depth of the device 10 is such that it can be held comfortably by the user with only minor contraction of the fingers and thumb.

Referring still to FIG. 1, the device 10 of the present invention further consists of a ball 16 disposed upon the upper left portion of the body 11, part of which protrudes above the body 11 through a circular opening 20 with the remaining portion inside the body 11 and thus not shown. In addition to the ball 16 protruding through the top of the body 11, the ball 16 is slightly exposed on the left side of the body 11 through the same circular opening 20. The ball 16 is preferably made of a smooth, hard plastic, as is known in the art. Preferably the ball 16 is as large as possible to give the user accurate control over the cursor during both work surface and hand-held use. However, the ball 16 size is limited so that it can be easily and comfortably manipulated by the user's thumb. The ball 16 is further limited so as to avoid adding too much weight to the device 10 or necessitating a larger body which would not comfortably fit in the user's hand. The size of the ball 16 shown in the FIGS. 1–4 is only one of a various sizes that may be suitable for inclusion in the device 10 of the present invention. The shape of the body 11 and disposition of the ball 16 is such that during both work surface and hand-held use, the user's thumb can be easily moved between a resting position on the body 11 and placement on the ball 16. As noted above, the mirror-image of this description is also claimed as my invention as an embodiment of the device 10 for use by the left hand, as shown in FIGS. 3 and 4.

The body 11 further consists of an enter key 12 and a drag key 14 both disposed on the forward top of the body 11. More specifically, again referring to FIG. 1, the enter key 12 is mounted on the top, frontal portion of the body 11 and the drag key 14 is mounted on the top, right frontal portion of the body 11, to the contiguous right of the enter key 12. The keys 12 and 14 extend from the top, forward portion of the body 11 and angle downward along the body's 11 frontal curvature 24 to occupy the upper portion of the forward side of the body 11. The width of each key 12 and 14 is slightly greater than the width of the average person's finger such that when the user's finger rests on one of the keys 12 and 14 the entire width of the finger is accommodated by that key 12 or 14. The keys 12 and 14 offer sufficient resistance to the user's fingers to prevent their inadvertent actuation, but said keys 12 and 14 are sensitive enough to allow actuation when slight inward or downward force is applied by the user's fingers. The keys 12 and 14 take the same contour as the body 11 and are at all points flush therewith. The keys are preferably made of the same injected molded plastic as the remainder of the body 11. The disposition of the keys 12 and 14 orient the hand in relation to the body 11 such that the thumb is in the most optimum place to control the ball 16 and the ulnar fingers rest near or against the side of the body 11 which is opposite the ball 16.

The device 10 of the present invention further consists of a cable 18 fixed in a single position on the bottom side of the body 11 by a cable neck (not shown). The cable 18 provides power for the device 10 of the present invention and is intended to connect the device 10 with the computer system (not shown) for the transmission of data. Because the device 10 of the present invention is capable of being used while the user's arm moves freely about, the cable 18 may be longer than cables typically found in the art. The cable 18 itself is not claimed as a part of this invention, but is discussed and shown only for the purpose of making a full disclosure.

The means of operating the device 10 of the present invention is in all respects the same whether being used on the work surface or while hand-held. Referring to FIG. 1, when the device 10 of the present invention is being used on the desk-top 100, the underside of the body 11 lays flat on said desk-top 100. The thumb is positioned on or near the ball 16 and can be rested in either of those positions or can be kept to the side of the body 11, to the left of the ball 16. The thumb is oriented so as to allow easy and comfortable manipulation of the ball 16. The forefinger is positioned on or above the enter key 12 and the middle finger is positioned on or above the drag key 14, permitting easy and comfortable actuation of said keys 12 and 14. The ulnar fingers rest next to or against the side of the body 11 which is opposite the side containing the ball 16. The palm of the user's hand rests on the lower portion of the body 11 and is filled by the swell 26. As noted earlier, this description applies equally to the mirror-image of the device as shown in FIG. 3 for an embodiment intended for use by the left-hand.

Referring to FIG. 2, when the device 10 of the present invention is being used in a manner off of a desk-top, the device does not lay or rest on the desk-top 100, but is instead supported above the desk-top 110 by the user's hand. The thumb rests on or near the ball 16 or can be kept to either side of the body 11. While being hand-held, the device 10 of the present invention works to orient the user's thumb for easy and comfortable manipulation of the ball 16. The forefinger rests on or above the enter key 12 and the middle finger rests on or above the drag key 14, permitting easy and comfortable actuation of said keys 12 and 14. The disposition of the keys 12 and 14 further align the hand such that the foremost portions of the ulnar fingers wrap around the side of the body 11 opposite the ball 16 and under the body 11 to support and hold the device 10 in the user's hand. According to the user's preference, the body 11 may alternatively or additionally be held by slight pressure from the tips of the user's first two fingers which are aligned to naturally occupy the frontal curvature of the body 11. The ability to use the device 10 of the present invention while hand-held, thus allowing a freely moving hand, or while the device is laying on the work surface, is the most significant advantage of the device 10 of the present invention as it is ideal for reducing fatigue in the user's arm and reducing repetitive stress injuries associated with use of cursor controllers. As noted earlier, this description applies equally to the mirror-image of the device as shown in FIG. 4.

The device 10 of the present invention functions in the manner typical for known cursor control devices. Namely, the ball 16, the enter key 12, the drag key 14, and the cable 18 are to be connected to a circuit board (not shown) inside the body 11. The ball 16, which protrudes above the body 11, is manipulated by the user. As the ball 16 rotates it touches and turns two rollers (not shown) mounted at 90-degree angles to each other. One roller responds to back-and-forth movements of the ball 16 and transmits data through the circuit board to the computer to move the cursor on the screen correspondingly to the movement of the ball. The other roller senses sideways movements, which correspond to side-to-side movements of the cursor on the screen. A spring loaded idler caster as known in the art (not shown) is provided to support and hold the ball 16 against the rollers. Additional spring loaded mechanisms (not shown) inside the body 11 urge the ball 16 upward partially through the circular opening 20 and prevent gravity from forcing the ball 16 to recede into the body 11. The circuit board outputs a signal which is processed and generated into data and sent to the computer through the cable 18. This electrical and computer technology is not claimed as my invention but is discussed here for the purpose of making a full disclosure. The device 10 of the present invention is not limited to this or any particular technology, but can be made to incorporate different and new technology as would best effectuate the objects of the device 10 of the present invention.

The functioning of the device 10 of the present invention further consists of actuation of the keys 12 and 14 by the user to send additional data to the computer through a process similar to the one described above in relation to the ball 16. Actuation of the keys 12 and 14 sends a signal through conductors to the circuit board. The circuit board, in turn, outputs a signal which is processed and generated into data and sent to the computer through the cable 18. The keys 12 and 14, which are disposed flush with the body 11, require only slight pressure to be actuated. However, the necessary pressure to activate the keys 12 and 14 is sufficient so that the user's fingers may rest on the keys 12 and 14 and can be used, in addition to the rest of the hand, to hold the body 11 without the keys 12 and 14 being inadvertently activated. Again, the device 10 of the present invention is not limited to this or any particular technology, but can be made to incorporate different and new technology for its functioning.

While the above description of the device 10 of the present invention contains many specificities, these should not be construed as limitations on the scope of the invention, but rather as an exemplification of one preferred embodiment thereof. For example, as an alternative to the above-described location of the cable 18 connection to the body 11, the cable 18 may be fixed at the frontal curvature 24 of the body 11. This embodiment may provide a means by which the cable 18 is less obstructive with operation of the device 10.

As another alternative embodiment, instead of a ball 16 being included in the device 10 of the present invention to control the movement of the cursor, the device 10 can contain a touchpad (not shown) to control the cursor. The touchpad (not shown) would be located in the approximate position occupied by the ball 16 and would be activated by the user's thumb. Use of the device 10 of the present invention would, in all other respects, be the same as already described.

As an alternative embodiment, instead of a ball 16 and instead of a touchpad (not shown), the device 10 can contain an isometric post (not shown) as a means of controlling the cursor. The isometric point (not shown) would be located in the approximate position occupied by the ball 16 and would be activated by the user's thumb. Use of the device 10 of the present invention would, in all other respects, be the same as already described.

As an alternative to a ball 16, touchpad (not shown) or isometric post (not shown), the device 10 of the present invention may contain a navigation dome (not shown) as a means of controlling the location of the cursor on the computer screen.

As an alternative to use of a cable 18, the data may be sent from the device 10 of the present invention to the computer (not shown) by wireless techniques, such as infra-red or radio frequency transmissions. In a wireless embodiment, send/receive transducers (not shown) would be disposed at locations on the forward portion of the body 11 and would include a transparent shade (not shown) which provides an aperture for the passage of light energy therethrough. The transparent shade would hold a transmitter (not shown) on the inside with the transmitter being connected to the circuit board (not shown) inside the body 11. In this wireless embodiment the data generated by the rollers, optical encoders and circuit board is sent by electrical signals through a transducer window from the device 10 to a receptor on the computer (not shown). In response to this data, circuitry within the computer causes the cursor on the computer screen to move. In all other respects, use of the device 10 would be as already described. This process of wireless transmission of data is not claimed as my invention and is therefore not described in detail but is instead discussed for the purpose of making a full disclosure. The device 10 of the present invention is not limited to this or any particular wireless technology, but can be made to incorporate different and new technology as would best effectuate the objects of the device 10 of the present invention.

Another alternative embodiment occurs with the device 10 having slight grooves (not shown) on the side opposite the side with the ball 16 to accommodate the user's ulnar fingers. The grooves would also increase the comfort to the user, particularly while the device 10 of the present invention is being hand held. Furthermore, the device 10 is being hand-held or used on a work surface, the position of the grooves would work to align the user's thumb with the ball 16, forefinger with the enter key 12 and middle finger with the drag key 14. A mirror-image of the embodiment described would be effective for the left-handed version of the device 10, as shown in FIGS. 3 and 4.

Another alternative embodiment of the device 10 of the present invention, has the body 11 further comprising a scroll wheel (not shown), as known in the art, which can be disposed between or near keys 12 and 14. Scroll wheels permit the up and down scrolling of windows on the computer screen without requiring the "pointing and clicking" technique typically required in a graphical environment. The scroll wheel consists of a spring-loaded supplementary control in the body 11 for generating additional transmissions to the computer which specifically control the scrolling rate and direction. Again, because the electrical and computer interface functions of the device 10 of the present invention are not claimed, they are described only briefly herein, merely for the purpose of making a full disclosure.

Another alternative embodiment has the ball 16 connected inside the body to optical encoders (as opposed to rollers) for transmission of data from the ball through the circuit board and to the computer. However, this electrical and computer processes are not claimed as a part of this invention and are therefore described not in detail or shown in the drawings but are merely discussed for the purpose of making a full disclosure. None of these alternative embodiments should be viewed as limiting the scope of the claimed portion of the device 10 of this invention.

The device 10 of the present invention provides a cursor controller with an ergonomic design suitable for hand-held or work surface. The design of the device 10 of the present invention minimizes back, arm, hand and wrist fatigue even during protracted periods of continues use. During work surface use, as shown in FIG. 1, the device remains substantially stationary and can rest next to the computer keyboard, where the device 10 is readily accessible to the user. During hand-held use, as shown in FIG. 2, the user can operate the device 10 of this invention with a freely moving arm and hand. In addition to the ergonomic advantages, this allows the device 10 to be used when there is no or insufficient area on the work surface on which to operate the device 10. The device 10 of the present invention also provides a means of controlling a computer cursor while the user is in a standing position, while the user's hand is resting on the user's lap, while the user puts his arm in a relaxed position next to his or her side, and while allowing user to achieve a truly neutral hand position. The cursor control device 10 of the present invention also allows for use in a variety of hand and body positions, such as a reclining or laying, as decided by the needs and preference of each individual user.

It will now be understood that what has been disclosed herein comprises a novel cursor control device. Those having skill in the art to which the device 10 of the present invention pertains, will now, as a result of the applicant's teaching herein, perceive various modifications and additions which may be made to the invention. For example, the precise shapes described herein may be readily altered in varying ways while achieving the same objectives of the invention. For further example, the degree of the swell 26 may be increased or decreased without substantially reducing the principal advantages of the invention. Furthermore, the device 10 can be made in different sizes, can be custom designed for individual users and can be made in various colors. The device 10 can also be adjusted in shape so as to accommodate future advances in ergonomic sciences. Accordingly, the scope of the device 10 of the present invention should be determined not by the embodiment illustrated, but by the appended claims and their legal equivalents. All such modifications and additions are deemed to be within the scope of the invention which is to be limited only by the claims appended hereto. It is to be understood that the drawings are designed for purposes of illustration only and are not intended as a definition of the limits and scope of the invention disclosed. It is the following claims, including all equivalents, which are intended to define the scope of this invention.

What I claim as my invention is:

1. A cursor control device comprising:
    a body shaped to fit in a user hand so a user can operate said device in desk-top and in off the desk-top manners, said shape consisting of a slight swell to fit a palm of a user, a width less than the width of the hand of the average user and a length allowing the fingers of the hand of a user to occupy the frontal curvature of said device while said swell fits in the palm of a user;
    a cursor control at about a front corner of said body such that a thumb of the user rests on said cursor control and the swell fits a palm of a user when the device is operated in desk-top and off the desk-top manners;
    at least one button on said body positioned such that a finger of the user rests on said at least one button and the swell fits a palm of a user when the device is operated in desk-top and off the desk-top manners;

a control circuit inside said body connected to said at least one button and said cursor control; and a communication link connectable between said control circuit and a processing unit.

2. The device of claim 1, wherein the width of said body is less than the width of the hand of the average user so that the ulnar fingers of the hand of a user rest to the side of the body when said device is used in a desk-top manner and wrap around and under the device when said device is used in an off the desk-top manner.

3. The device of claim 1, wherein the depth of said device allows the ulnar fingers of a hand of a user to wrap around and under the device while the palm rests on said swell when the device is used in an off the desk-top manner.

4. The device of claim 1, further comprising:

at least one groove positioned on the side of said body such that an ulnar finger of the user rests in said groove when the device is operated in desk-top and off the desk-top manners.

5. The device of claim 1, wherein said cursor control is a ball.

6. The device of claim 1, wherein said cursor control is a touchpad.

7. The device of claim 1, wherein said cursor control is an isometric post.

8. The device of claim 1, wherein said cursor control is a non-contacting magnetic technology.

9. The device of claim 1, wherein said at least one button is comprised of a left button and a right button.

10. The device of claim 1, wherein said at least one button occupies the frontal curvature of the body.

11. The device of claim 1, wherein said cursor control is at about a front corner of said body and the distance from the cursor control to the bottom edge of the body is about equal to the length of the thumb of the average user.

* * * * *